United States Patent [19]

Betz et al.

[11] Patent Number: 4,838,694
[45] Date of Patent: Jun. 13, 1989

[54] PROCESS FOR IMAGING LASERINTERFEROMETRY AND A LASERINTERFEROMETER FOR CARRYING OUT SAID PROCESS

[75] Inventors: Hans Betz, Berlin; Herman Mader, Unterhaching; Joachim Pelka, Berlin, all of Fed. Rep. of Germany

[73] Assignee: Fraunhofer Gesellschaft zur Förderung, Munich, Fed. Rep. of Germany

[21] Appl. No.: 113,275

[22] PCT Filed: Jan. 8, 1987

[86] PCT No.: PCT/DE87/00002

§ 371 Date: Sep. 9, 1987

§ 102(e) Date: Sep. 9, 1987

[87] PCT Pub. No.: WO87/04237

PCT Pub. Date: Jul. 16, 1987

[30] Foreign Application Priority Data

Jan. 8, 1986 [DE] Fed. Rep. of Germany ....... 3600346

[51] Int. Cl.$^4$ .............................................. G01B 9/02
[52] U.S. Cl. .................................... 356/357; 156/626
[58] Field of Search ......................... 356/357; 156/626

[56] References Cited

U.S. PATENT DOCUMENTS 3,461,261  8/1969  Lewis et al. .
3,465,114  9/1969  Bleackley et al. .
3,861,804  1/1975  Lehmbeck et al. .
4,207,452  6/1980  Arai .
4,417,116  11/1983  Black .
4,618,262  10/1986  Maydan et al. .

FOREIGN PATENT DOCUMENTS 3024539  4/1982  Fed. Rep. of Germany .
57-26317  2/1982  Japan .
58-170416  7/1983  Japan .

OTHER PUBLICATIONS

IEEE Transactions on Industrial Electronics and Control Instrumentation, vol. IECI-27, No. 1, Feb. 1980.
Patent Abstracts of Japan, vol. 8, #72 (P-265), (1509), Apr. 4, 1984 (Abstract).
Article "Thin Film Monitor for In Situ Measuring of Silicon Etch Rates", from IBM Technical Disl. Bulletin, vol. 24, #9.
Article from *Solid State Technology*, "Methods of End Point Detection for Plasma Etching", vol. 24 (1981).

*Primary Examiner*—Davis L. Willis
*Assistant Examiner*—Matthew W. Koren
*Attorney, Agent, or Firm*—Barnes & Thornburg

[57] ABSTRACT

The present invention relates to a laserinterferometric process, in particular, for use in etching thin layers, whereby a layer to be examined is radiated with a laser passing over a surface of the layer and the intensity of the reflected laser beam, which is composed of a beam reflected from the surface of the layer to be examined and one reflected from its lower interface is ascertained and evaluated by a data processing system from which the information concerning the layer to be examined is read out. The present invention also relates to an imaging laserinterferometer comprising a modulator, which deflects the laser beam, a detector for the reflected laser beam and a data processing systen, which analyzes the detector signals.

21 Claims, 3 Drawing Sheets

PROCESS FOR IMAGING LASERINTERFEROMETRY AND A LASERINTERFEROMETER FOR CARRYING OUT SAID PROCESS

BACKGROUND AND SUMMARY OF THE INVENTION

The present invention relates to a laserinterferometric process intended for use in etching layers and to a laserinterferometer for the examination of a layer, in particular for carrying out said laserinterferometric process.

Interferometric examinations are often employed in the examination of thin layers. In this application, laserinterferometers have become quite predominant. They are used, e.g. in the etching of thin layers to determine the etch rate and the termination of etching, which will be made more apparent with reference to FIGS. 1 and 2. The layer to be etched 2, which is placed on a substrate 1, is radiated by a laser. With transparent layers, the incident laser beam 10 is partially reflected at the surface of the layer 2 and partially at the interface of layer 2 to substrate 1. The reflected laser beam, thus, is composed of two beams, designated 20 and 22. The phase difference of the two reflected beams depends on the thickness of the layer 2 to be etched. Depending on the phase relation or phase difference, the beams 20 and 22 become stronger or weaker. If the thickness of the layer 2 changes, as is the case in etching, the resulting reflected laser is of changing intensity. A periodicity of the intensity of the reflected laser beam ensues, which is illustrated in FIG. 2. The etch rate can be ascertained from the temporal course of the intensity of the reflected laser beam, i.e. from the period T. When the layer 2 has been etched away, so that the incident beam 10 only strikes the substrate 1, the result is usually a lack of change in the reflectivity, so that the intensity of the reflected laser beam produces a bend in the intensity curve. This bend or stand value indicates the termination point of the etching process, designated 3 in FIG. 2.

Furthermore, deflecting a laser beam by a modulator is known. Such devices, called laser scanners, are employed, by way of illustration, in health care technology or in certain holographic processes.

A disadvantage in the known laserinterferometer devices is that the fixing must be precise in order to analyze specific locations of the layer to be examined.

The object of the present invention is, proceeding from the aforegoing state of the art, to provide a laserinterferometric process and a laserinterferometer, which permits an "on-line" analysis of the surface to be examined, particularly at selected points.

With the present invention, it is possible to obtain a visual representation of the surface to be examined by a laserinterferometer. The laser beam passes over a defined surface of the layer to be examined, whereby it is deflected two-dimensionally. The intensity of the reflected laser beam can be ascertained for the entire examined surface point by point according to the laser passing over point by point or line by line and evaluated via the linked-up data processing system. The invented process simplifies the use of laserinterferometers as no complicated fixing of the location to be analyzed is required prior to the examination, but rather an electronic localization. Thus even very small zones can now be analyzed, e.g. contact holes. Laserinterferometers can now also be employed in cases of a very small ratio of etching surface to masking surface.

In the invented laserinterferometer, it is expedient to employ a HeNe laser or a UV laser. Naturally other types of lasers can also be used. For example in a number of cases, a laser with a wavelength of variable frequency has proven to be suitable.

In the invented process, the laser beam is deflected electro-mechanically, permitting low power input and rapid scanning of the surfaces to be examined.

In an expedient variant of the process, the laser beam is deflected by an electrically modulated crystal.

Optical means are preferably used for the deflection or imaging of the laser beam. In this connection semipermeable mirrors, by way of illustration, can be employed. It is particularly expedient to direct the laser beam to the layer to be examined via glass fiber optics, whereby the light wave conductor is expediently directed over the surface to be examined. The local resolution power of the laser beam can be increased by a lens system via which the laser beam is visually represented and focused on the layer to be examined.

In order to improve the signal-to-noise ratio, the laser beam is modulated with a frequency that can be fixed and the reflected laser beam at this narrow band frequency is detected.

Another measure is to separate the mixed signals electronically and to suppress the signal noises.

The invented scanning of the layer to be examined permits, on the one hand, an analysis of the entire layer using a data processing system to produce visual representation of the surface of the layer to be examined. On the other hand, the present invention permits making an analysis at any desired point of the layer to be examined, particularly electronically.

Thus, etch rate can be determined for any desired point of the surface of the transparent layer to be etched when etching thin layers.

In another variant of the present process for etching thin layers, the point of termination of any desired point of the surface is detected. Furthermore, the uniformity of the etch rate and the termination point in the layer to be etched can be determined.

In the variant of the process, the selectivity is determined locally resolved on the layer to be etched.

An advantageous method of analyzing the reflected laser beam "on-line" is provided. This method permits rapid adapting of the treatment, particularly of the etching, of the layer to be examined or treated. Moreover the entire surface can be visually represented by timing and examined in connection with the whole. The signals from the data processing system are advantageously employed, to process control, permitting adapting of the etching step directly to the actual condition of the material and especially precise work.

A display screen and/or a plotter is preferably used for the data readout. The intensity of the reflected laser beam can be shown on the display screen, which, thus, delivers a visual representation of the surface to be examined. In order to make this visual representation of the surface to be examined more lucid, the different intensity values can be assigned different colors. In this manner, a multicolored visual representation is shown on the display screen, yielding a rapid surface analysis of the surface to be examined. Naturally, the local etch rate or the local termination point of the etching can also be visually represented.

In particular, the invented laserinterferometer is advantageously suited to carry our the invented process. For construction as an imaging laserinterferometer, only a modulator and a data processing system are additionally employed. Said construction is not substantially much more complicated. Preferably the modulator contains an electromechanical deflector system, which contains an electrically modulated crystal.

To direct the laser beam to the surface to be examined, it is advantageously provided with the lightwave guide. The respective deflector unit is steered over the surface to be examined and adjusted. In order to increase the resolution, it is expedient to insert an appropriate lens system in the path of the beam, to focus the beam to the surface to be examined.

A preferred embodiment of the invented interferometer contains a device to increase the signal-to-noise ratio. A modulation device can be provided for this purpose, which modulates the amplitude of the laser beam with a fixed frequency. The frequency corresponding to a narrow band of the modulation frequency is detected. Moreover, electronic devices can be provided, which separate the mixed signals and suppress the noise.

The invented laserinterferometer is preferably provided with a display screen. The display screen permits advantageously the adjustment of the surface to be examined, in such a manner that an overall impression is given of the surface, by illustration during treatment, particularly an etching process. In this way the operation can be observed and examined "on-line". A plotter can be provided as an alternative for or additionally to a display screen.

The invented interferometer is preferably used to determine the etch rate and the termination point in the etching of thin layers. It can be employed particularly advantageously for process control as data on the entire surface to be examined or to be treated can be ascertained.

Other objects, advantages and novel features of the present invention will become apparent from the following detailed description of the invention when considered in conjunction with the accompanying drawings.

DETAILED DESCRIPTION OF THE DRAWINGS

Figure 1:
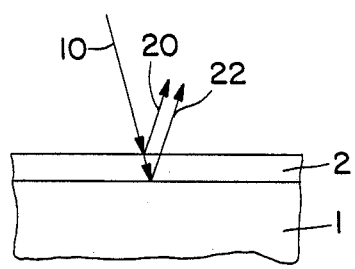
FIG. 1 is a schematic representation of the principle of a laserinterferometer to determine the termination point and the etch rate.
Figure 2:
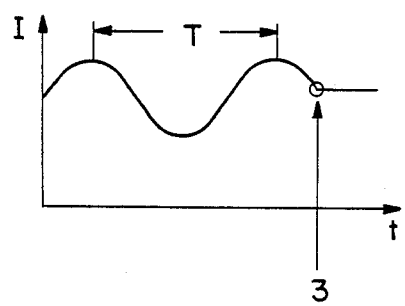
FIG. 2 is a diagram, in which the intensity of the reflected laser beam during the etching of a thin transparent layer is shown versus the time t, and from which the etch rate and the termination point can be determined.
Figure 3:
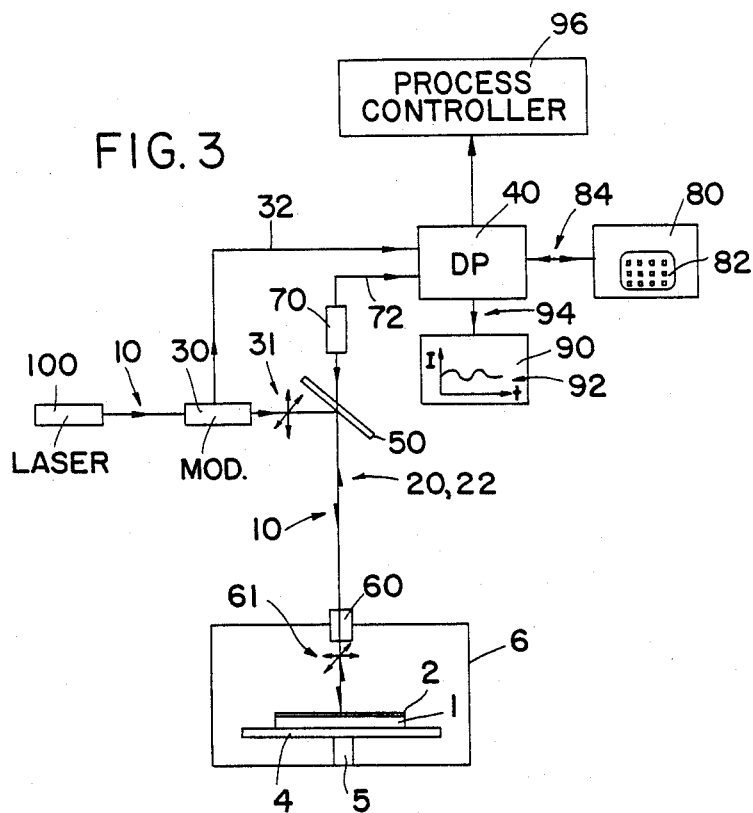
FIG. 3 is a schematic representation of the construction of an imaging laserinterferometer according to the principles of the present invention.

The construction of an invented imaging laserinterferometer is described in the following with reference to FIG. 3. A laser 100, which may, by way of illustration, be a gas laser, is provided as the source for a laser beam 10. A modulator 30 represents a deflector unit and serves the purpose of deflecting the laser beam 10 two-dimensionally as is illustrated by the crossed arrows at 31. The modulator 30 may be an electromechanical deflection system including an electrically modulated crystal. The intensity of the laser beam 10 is modulated with a fixed frequency. A signal line 32 leads from the modulator 30 to a data processing system 40 to provide the modulation frequency to be used for detection and noise reduction. Inserted in the path of the beam is an angularly positioned semi-permeable mirror 50, which steers the laser beam 10 to the target, i.e. to the surface to be examined. Arranged behind the semi-permeable mirror 50 above the surface to be examined are optical means 60, which may be, by way of illustration, a lightwave guide, for example glass fiber optics, and/or a lens system. The optical means 60 focuses the beam 10 to increase its resolution and guide the beam 10 over the surface to be examined. The power lines leading to the modulator 30 and to the data processing system 40 are not depicted in this schematic representation for reasons of clarity.

In the shown preferred embodiment, the invented laserinterferometer is employed in connection with an etching reactor 6. In the etching reactor 6, a to be treated semiconductor disc, i.e. a substitute 1, is arranged on a sample plate 4 held by a support device 5. On the substrate 1 lies a layer 2 which is to be selectively etched away. For this purpose, an etching masking is customarily used.

The optical means 60 and the semi-permeable mirror 50 let pass the laser beams 20, 22 reflected from the surface to be examined. A detector 70 is provided in the optical path behind semi-permeably mirror 50. The detector detects the reflected laser beams 20, 22 and transforms the optical information into data signals. The detector 70 is connected via a line 72 with the data processing system 40.

A display screen apparatus 80 having a display screen 82 is linked up to the data processing system 40. A visual representation of the surface to be examined is schematically depicted on the display screen 82. The display screen apparatus 80 also contains means, by which other representations from the data processing system can be requested as is illustrated by the double arrow at 84. In this respect, the display screen apparatus is operable as an active terminal. Linked up to the data processing system 40 is also a plotter 90. For demonstration purposes, an example 92 of a diagram reproduced by the plotter 90 is depicted. As the single arrow 94 shows, the plotter 90 is only conceived as a readout device.

The invented imaging laserinterferometer operates as follows: the laser beam 10 emitted from laser 100 is deflected two-dimensionally by modulator 30. The laser beam 10 is reflected at the semi-permeable mirror 50, being bent 90 degrees in the described preferred embodiment. Subsequently, the laser beam 10 is directed by the optical means 60. The reflected laser beam is composed of two displaced-in-phase beams 20, 22, corresponding to the reflection of the laser beam 10 from the surface of the layer to be etched 2 and its interface to the substrate 1. These beams 20, 22 are directed through the semi-permeable mirror 50 and received by the detector 70. The optical information is transformed into electrical signals in the detector 70 and fed to the data processing system 40. The data processing system 40 also receives the signals from the modulator 30, which concern its deflection function and which make a temporally correcting correlation of the data received and their evaluation possible. Since the intensity of the laser beam is modulated with a fixed frequency, the reflected laser beam is detected at a narrow band about the modulated frequency. The combined or united signals from detector 70 are separated electronically and signal noise is suppressed to increase the signal-to-noise ratio. The electric signals are processed in the data processing system 40 readout in peripheral units, such as, by way of illustration, the display screen apparatus 80 and the plotter 90 and/or used in a process controller 96.

In this manner, the data of the surface to examined can be ascertained during the operation and the surface to be examined or to be treated is visually represented. In an etching operation, by way of illustration, the etch rate, the termination point, the selectivity of the etching can be processed and read out during the etching operation, i.e. "on-line" in this way.

Figure 4:
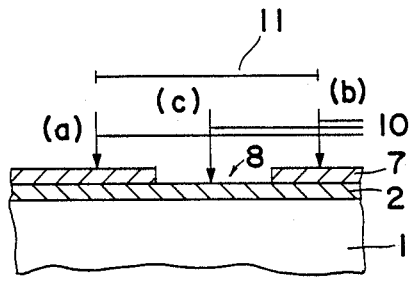
FIG. 4 is a schematic representation illustrating the local relationship of the surface to be etched and the etching masking as well as of the radiated area.

FIG. 4 shows in more detail a surface to be examined by the invented imaging laserinterferometer. The substrate 1 is schematically indicated, where as the layer 2 and the etching masking 7 are depicted in cross section. The etching masking 7 does not cover the entire layer, but includes an opening exposing an area uncovered 8 of layers, which is to be etched away. The selected surface to be examined comprises both the exposed area 8 and parts of the etching masking 7 as is illustrated by the marginal beams (a) and (b) for laser beam 10. This area is illustrated once more—one-dimensionally—by the designation 11. With such an arrangement in etching reactor the 6, the following information can be read out via the display screen: the etch rate of the layer 2 or of the etching masking 7 at any desired points, the termination point of layer 2 at every desired point and, if necessary, the point of termination of the etching mask 7 at every desired point of the examined surface. Moreover, the uniformity of the etching operation can be monitored. By passing over the etching masking 7 and the layer 2 at area 8, it is possible to visually represent the selectivity of the etching operation layer 2 with reference to the etching masking 7.

Figure 5:
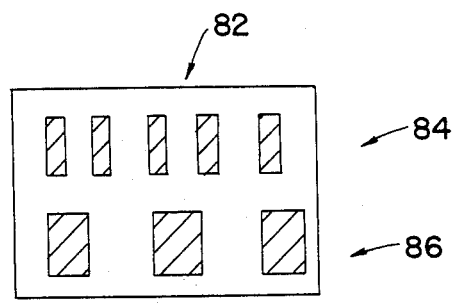
FIG. 5 is an example of a representation on a display screen connected to the data processing system.

FIG. 5 shows very schematically a readout visual representation 82 on the display screen apparatus 80. Shown at 84 are, by way of illustration, surface representations of the etching masking 7, and at 86 are the surface representations of the area 8. The individual representations differ in lightness and/or color, depending on whether the different intensity values are assigned different grades of lightness or color values. When the lightness or color no longer changes on the display screen, the termination point in the etching operation has been reached.

Figure 6A:
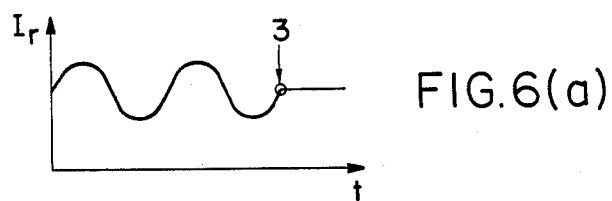
FIGS. 6a and 6b are examples of diagrams read out via a plotter connected to the data processing system, depicting (a) the temporal behavior of the intensity $I_r$ of the reflected laser beam, and (b) as the local change in the etch rate dependent on the coordinate x.
Figure 6B:
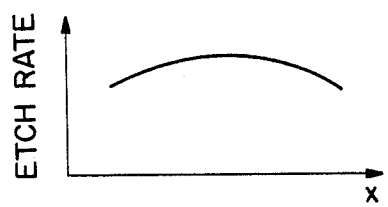

FIG. 6a and 6b show examples of readout diagrams on the plotter 90. FIG. 6a illustrates a diagram similar to the schematically depicted diagram 92 in FIG. 3. The intensity $I_r$ of the reflected laser beam is depicted versus time t. The temporal course of the intensity of the reflected laser beam is periodic until the etching process has terminated as is illustrated by the bend or flat curve portion at 3 in the depicted curve, which graphically reproduces the point of termination. The etch rate can be ascertained at a selected point from this diagram.

FIG. 6b illustrates the course of the etch rate along the examined surface. The etch rate is shown versus the local coordinate x. Yielded is a continuous, but not completely constant etch rate course. This curve makes it possible to determine the uniformity of the etch rate, the local selectivity of the etching film as well as the point of termination of the etching.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A laserinterferometric process for examining a thin layer on a substrate comprising:
   radiating a specific surface of said thin layer to be examined by passing a laser beam over said specific surface;
   deflecting said laser beam by an electrically modulated crystal onto said specific surface;
   detecting the intensity of a reflected laser beam which is composed of a beam reflected from said specific surface and a beam reflected from the interface of said thin layer and said substrate;
   evaluating said detected intensity in a data processing system; and
   providing a readout of information concerning said layer to be examined.

2. A processing according to claim 1, including directing said laser beam over said specific surface by optics.

3. A processing according to claim 1, including focusing said laser beam to increase the resolution.

4. A process according to claim 1, including electronically evaluating said reflected beam for a desired point of the surface of the layer to be examined.

5. A process according to claim 4 for use in etching thin layer, including determining the etch rate for a desired point of the surface of the layer to be etched.

6. A process according to claim 4 for use in etching thin layers, including detecting the point of termination at a desired point of the surface of the layer to be examined.

7. A process according to claim 6, including determining the uniformity of the etch rate and the point of termination in the layer to be etched.

8. A process according to claim 4, including differentiating a layer to be etched from its surroundings.

9. A process according to claim 4, wherein said evaluating of said reflected laser beam is performed simultaneously with etching.

10. A process according to claim 1, including controlling a process with signals from the data processing system.

11. A process according to claim 1, including visually representing the information of said reflected laser beam.

12. A laserinterferometer for examination of a surface of a layer on a substrate comprising:
    laser means for producing a laser beam;
    modulator means including an electrically modulated crystal for deflecting said laser means on to said layer;

detector means for detecting reflected laser beams and providing detector signals; and data processing means for analysis of said detector signals and providing a readout of information concerning said layer.

13. A laserinterferometer according to claim 12, including a glass fiber optic means for guiding the laser beam to the surface to be examined.

14. A laserinterferometer according to claim 12, including a focusing optic means for focusing said laser beam on the surface to be scanned.

15. A laserinterferometer according to claim 12, including means for increasing the signal-to-noise ratio.

16. A laserinterferometer according to claim 12, including a display screen connect to the data processing means.

17. A laserinterferometer according to claim 12, including a plotter connected to the data processing means.

18. The use of said laserinterferometer according to claim 12, wherein said data processing means provides a process control signal.

19. A laserinterferometric process for examining a thin layer on a substrate comprising:

radiating a specific surface of said thin layer to be examined by passing a laser beam over said specific surface;

modulating the intensity of said laser beam with a fixed frequency;

detecting the intensity of a reflected laser beam in a narrow band about the modulating fixed frequency which is composed of a beam reflected from said specific surface and a beam reflected from the interface of said thin layer and said substrate;

evaluating said detected intensity in a data processing system; and providing a readout of information concerning said layer to be examined.

20. A process according to claim 19, including deflecting said laser beam electro-mechanically onto said specific surface.

21. A process according to claim 19, including electronically separating detected modulated signals and suppressing noise using said separated signals.

* * * * *